(12) United States Patent
Jones

(10) Patent No.: US 6,443,416 B1
(45) Date of Patent: Sep. 3, 2002

(54) PIEZOELECTRICALLY CONTROLLED VIBRATION REDUCING MOUNT SYSTEM

(75) Inventor: Kenneth E. Jones, Oakton, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/962,231

(22) Filed: Sep. 26, 2001

(51) Int. Cl.[7] ............................................. F16M 13/00
(52) U.S. Cl. ........................ 248/550; 248/638; 248/678
(58) Field of Search ................................. 248/638, 637, 248/676, 677, 678, 550, 560, 562, 615, 620, 632, 634; 188/378

(56) References Cited

U.S. PATENT DOCUMENTS

| | | | |
|---|---|---|---|
| 4,887,788 A | 12/1989 | Fischer et al. | |
| 5,038,306 A | 8/1991 | Kellett | |
| 5,291,967 A | 3/1994 | Aoki | |
| 5,915,662 A | * 6/1999 | Itakura et al. | 248/561 |
| 6,029,942 A | 2/2000 | Daddis, Jr. et al. | |
| 6,062,526 A | 5/2000 | Morgenthaler | |
| 6,116,784 A | 9/2000 | Brotz | |
| 6,345,966 B1 | * 2/2002 | Hahn et al. | 248/635 X |

* cited by examiner

Primary Examiner—Ramon O. Ramirez
(74) Attorney, Agent, or Firm—Jacob Shuster

(57) ABSTRACT

Equipment having a source of vibration associated therewith is mechanically supported with strict positional tolerance on a floor surface by an elastic cylinder made of rubber. Such elastic cylinder is stiffened by a bulge restricting sleeve made of piezoelectric ceramic material so that fluctuating voltage applied thereto from a source of electrical energy under active control, during the continuous sensing of vibrations transferred to the surface, nulls the bulge restriction of the stiffening sleeve to reduce the vibrations transferred to the surface within the operational frequency range of the vibration source associated with the equipment.

7 Claims, 1 Drawing Sheet

PIEZOELECTRICALLY CONTROLLED VIBRATION REDUCING MOUNT SYSTEM

STATEMENT OF GOVERNMENT INTEREST

The invention described herein may be manufactured and used by or for the Government of the United States of America for governmental purposes without the payment of any royalties thereon or therefore.

The present invention relates generally to attenuation of vibrations imparted to a support.

BACKGROUND OF THE INVENTION

Support of equipment, having a source of vibration associated therewith, on a substructure surface by attachment thereto through a vibration isolation mount has been utilized to reduce the vibratory force impinging on the surface. Complete isolation is never achieved however because compliance or softness of the mount is necessarily limited in order to obtain adequate positional tolerance for the equipment being supported on the surface. It is therefore an important object of the present invention to provide support for such equipment loads on a surface through a vibration isolation mount with adequate positional tolerance, while permitting a reduction in vibration inducing forces transmitted therethrough.

SUMMARY OF THE INVENTION

In accordance with the present invention, the cylindrically shaped, viscoelastic component of the vibration isolation mount is interfaced throughout with a stiffening sleeve to restrict its bulging type distortion so as to strictly maintain positional tolerance for the equipment being supported. The sleeve is however made of a piezoelectric ceramic material so that it may be electrically excited under selective control to null its distortion restricting effect on the viscoelastic cylinder and reduce vibration inducing force while the equipment being supported is undergoing vibration within an operational frequency range. Toward that end, vibration of the supporting surface is continuously sensed so that when the vibration detected is within the operational frequency range, an electrical error signal is applied by a controller to the stiffening sleeve to institute said electrical excitation thereof through the controller as an active actuator for reducing vibrations.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

A section view of a vibration isolation mount is shown in contact with a floor surface for support of a schematically depicted vibrating equipment, together with associated components of an active control system.

DETAILED DESCRIPTION OF THE PREFERRED EMBODIMENT

Figure 1:
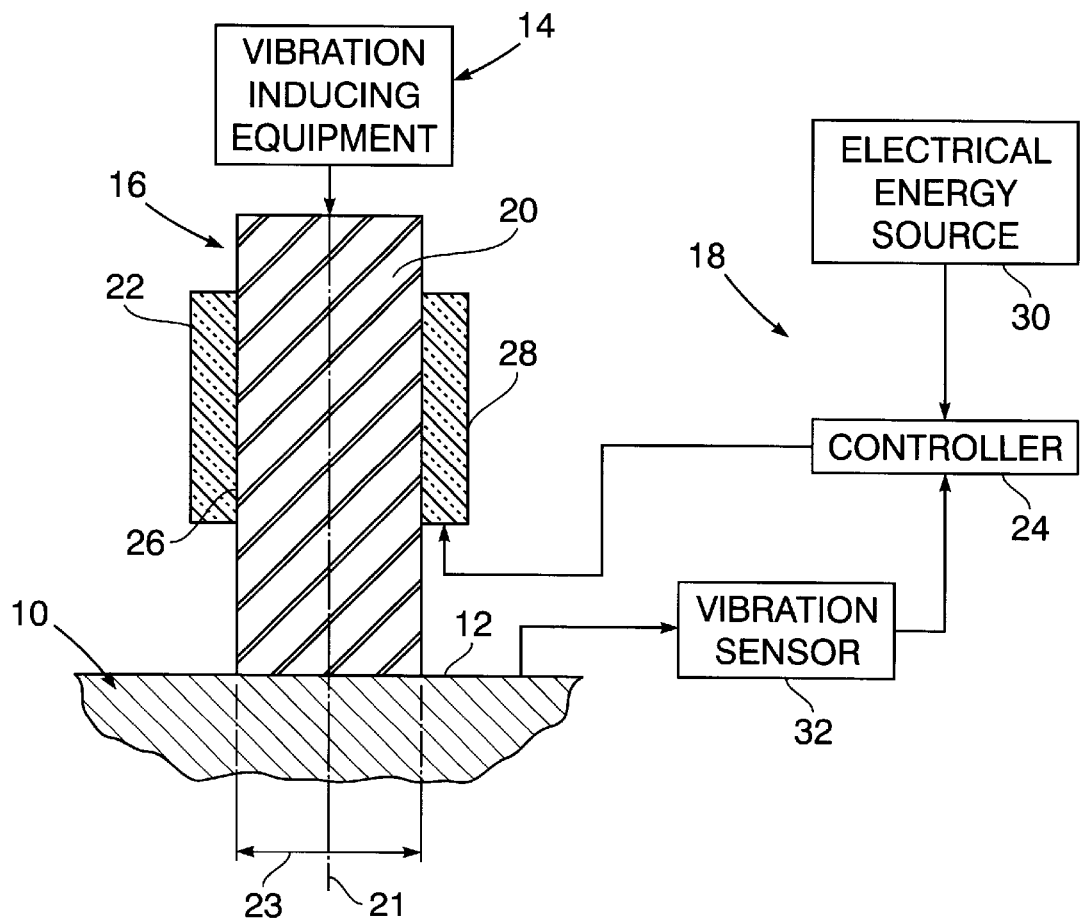

Referring now to the drawing in detail, a portion of a foundation or support structure 10 is shown, having a floor surface 12 over which some equipment 14 is disposed. The equipment 14 embodies a source of vibration within a broad operational frequency range. Examples of such equipment 14 include those with which foot or road traffic may be associated as the vibration source, a diesel engine undergoing vibration during operation to ordinarily cause transfer of uncomfortable vibration to the floor surface 12, and other vibrating machinery having small displacement amplitudes in the order of $10^{-6}$ mi, associated therewith.

Pursuant to the present invention, the equipment 14 is supported on the floor surface 12 with strict positional tolerance by means of a vibration mount device 16 through which vibration induced force is reduced under active control of a system 18. Positional tolerance is the maximum allowable static translation of the equipment position. Translation such as roll or pitch of machinery from a neutral position heretofore limited vibration isolation performance.

The mount device 16 includes a cylindrical mechanical component 20 made of a viscoelastic material such as rubber so as to be soft and elastic. The opposite axial ends of the component 20 along its axis 21, are respectively engaged with the floor surface 12 and the equipment 14 so as to undergo distortion in the form of circumferential strain and bulge that elongates its diameter 23, as well as axial strain along its axis 21. A reinforcing sleeve 22 made of piezoelectric ceramic material stiffens the soft viscoelastic component 20 against bulging to thereby strictly maintain positional tolerance. Thus, at very low frequencies near zero, the mount device 16 is very stiff. However within the broad band of operational frequencies associated with the equipment 14, stiffening by the sleeve 22 is selectively nulled under active control of the system 18 by effecting a fluctuation in the diameter 23 of the component 20. The circumferential strain so imposed on the reinforcing sleeve 22 is approximately one-half the axial strain imposed on the elastic cylindrical component 20 along its axis 21.

As diagrammed in the drawing, the system 18 includes a controller 24 connected to the sleeve 22 for electrical excitation thereof across conductive layers therein between its inner cylindrical surface 26 in interfacing contact with the component 20 and its outer surface 28, as a result of electrical power supplied from an electrical energy source 30. The fluctuating voltage so applied to the sleeve 22 varies its diameter to thereby accommodate the aforementioned bulging of component 20 to null the dynamic pressure exerted thereon at the interface surface 26 between the sleeve 22 and the component 20. Such active operation of the controller 24 occurs in response to an input error signal received from a sensor 32 continuously detecting vibrations transferred to the surface 12 from the equipment 14 through the mount device 16.

Based on the foregoing description, bulging of the soft cylindrical viscoelastic component 20 under dynamic loading is restricted by the stiffening sleeve 22 to a degree determined by the electrical voltage applied thereto through the controller 24. When such bulging is induced by the equipment 14 within its operational frequency range, as detected by the sensor 32, the controller 24 actively generates a fluctuating polarizing drive voltage applied to the sleeve 22 so as to null the dynamic stiffening pressure exerted through the interface surface 26 onto the cylinder component 20. The static pressure otherwise exerted at the interface 26 is maintained constant. Deflection of the mount device 16 under loading of a required magnitude is accordingly accomplished under selective control of the system 18 for vibration reducing purposes by virtue of the frequency dependent control imposed on the sleeve 22.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a vibration isolation mount disposed between equipment having a source of vibration associated therewith and a supporting surface, said vibration isolation mount having an elastic mechanical component and stiffening means surrounding the elastic component for restriction of diametrical bulging thereof during transfer of vibration; a system for reduction of vibratory force transferred to the surface through the elastic component during active operation of the vibration source, comprising: a source of electrical energy; sensor means for continuous detection of vibrations transferred to the supporting surface within a broad range of frequencies; and controller means responsive to said continuous detection by the sensor means for applying fluctuating voltage from said source of electrical energy to the stiffening means to substantially nullify said restriction of the diametrical bulging by the stiffening sleeve to effect said reduction of the vibratory force transferred to the supporting surface.

2. The combination as defined in claim 1, wherein said stiffening means comprises: a sleeve made of piezoelectric ceramic material; and wherein said elastic component is made of rubber.

3. In combination with a surface on which equipment having a source of vibration is supported by a vibration isolation mount through which attenuation of vibration transferred from said source onto the surface is performed, comprising: an elastic component physically interposed between said surface and the equipment through which forces induced by vibration of said source of vibration are transmitted; stiffening means on the elastic component for restriction of distortion by said forces transmitted therethrough to maintain strict positional tolerance during support of the equipment on the surface; and active control means connected to the stiffening means for selectively nullifying the restriction imposed on the elastic component in response to said vibration imparted to the surface within an operational frequency range of the source of vibration.

4. The combination as defined in claim 3, wherein said active control means includes sensor means on the surface for continuous detection of the vibrations imparted thereto by the elastic component.

5. In combination with a surface on which equipment having a source of vibration is supported by a vibration isolation mount through which attenuation of vibration transferred from said source onto the surface is performed, comprising: an elastic component through which forces induced by vibration are transmitted; stiffening means on the elastic component for restriction of distortion by said forces transmitted therethrough to maintain strict positional tolerance during support of the equipment on the surface; and active control means connected to the stiffening means for selectively nullifying the restriction imposed on the elastic component in response to said vibration imparted to the surface within an operational frequency range of the source of vibration, said active control means including: sensor means on the surface for continuous detection of the vibrations imparted thereto; a source of electrical energy; and controller means connected to the source of electrical energy and responsive to said continuous detection of the vibrations by the sensor means within said operational range of frequencies for applying a fluctuating voltage to the stiffening means to nullify said restriction imposed on the elastic component and thereby reduce the forces transmitted and the vibrations thereby imparted to the surface.

6. The combination as defined in claim 5, wherein said stiffening means is a sleeve made of a piezoelectric ceramic material.

7. In combination with a surface on which equipment having a source of vibration is supported by a vibration isolation mount through which attenuation of vibration transferred from said source onto the surface is performed, comprising: an elastic component through which forces induced by vibration are transmitted; stiffening means on the elastic component for restriction of distortion by said forces transmitted therethrough to maintain strict positional tolerance during support of the equipment on the surface; and active control means connected to the stiffening means for selectively nullifying the restriction imposed on the elastic component in response to said vibration imparted to the surface within an operational frequency range of the source of vibration, said stiffening means being a sleeve made of a piezoelectric ceramic material.

* * * * *